US009739613B2

(12) United States Patent
Coronato et al.

(10) Patent No.: US 9,739,613 B2
(45) Date of Patent: Aug. 22, 2017

(54) MICROELECTROMECHANICAL STRUCTURE WITH ENHANCED REJECTION OF ACCELERATION NOISE

(71) Applicant: STMicroelectronics S.r.l., Agrate Brianza (IT)

(72) Inventors: Luca Coronato, Corsico (IT); Gabriele Cazzaniga, Rosate (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/140,349

(22) Filed: Apr. 27, 2016

(65) Prior Publication Data

US 2017/0059322 A1     Mar. 2, 2017

Related U.S. Application Data

(63) Continuation of application No. 14/149,660, filed on Jan. 7, 2014, which is a continuation of application (Continued)

(30) Foreign Application Priority Data

May 11, 2009     (IT) .............................. TO2009A0371

(51) Int. Cl.
*G01C 19/5712*     (2012.01)
*G01C 19/5747*     (2012.01)
*G01C 19/02*       (2006.01)

(52) U.S. Cl.
CPC ..... *G01C 19/5747* (2013.01); *G01C 19/5712* (2013.01); *G01P 9/02* (2013.01); *Y10T 29/49002* (2015.01)

(58) Field of Classification Search
None
See application file for complete search history.

(56) References Cited

U.S. PATENT DOCUMENTS

| 4,159,125 A | 6/1979 | Buchwald |
| 4,744,248 A | 5/1988 | Stewart |

(Continued)

FOREIGN PATENT DOCUMENTS

| DE | 10 2007 012163 A1 | 10/2007 |
| DE | 10 2006 046772 A1 | 4/2008 |

(Continued)

OTHER PUBLICATIONS

U.S. Appl. No. 14/067,051, filed Oct. 30, 2013, Microelectromechanical Gyroscope with Compensation of Quadrature Error Drift.

(Continued)

*Primary Examiner* — Robert R Raevis
(74) *Attorney, Agent, or Firm* — Seed Intellectual Property Law Group LLP (57) ABSTRACT

An integrated MEMS structure includes a driving assembly anchored to a substrate and actuated with a driving movement. A pair of sensing masses suspended above the substrate and coupled to the driving assembly via elastic elements is fixed in the driving movement and performs a movement along a first direction of detection, in response to an external stress. A coupling assembly couples the pair of sensing masses mechanically to couple the vibration modes. The coupling assembly is formed by a rigid element, which connects the sensing masses and has a point of constraint in an intermediate position between the sensing masses, and elastic coupling elements for coupling the rigid element to the sensing masses to present a first stiffness to a movement in phase-opposition and a second stiffness, greater than the first, to a movement in phase, of the sensing masses along the direction of detection.

8 Claims, 7 Drawing Sheets

Related U.S. Application Data

No. 13/619,669, filed on Sep. 14, 2012, now Pat. No. 8,833,164, which is a continuation of application No. 12/776,178, filed on May 7, 2010, now Pat. No. 8,342,025.

(56) References Cited

U.S. PATENT DOCUMENTS

| | | |
|---|---|---|
| 4,750,364 A | 6/1988 | Kawamura et al. |
| 5,392,650 A | 2/1995 | O'Brien et al. |
| 5,447,068 A | 9/1995 | Tang |
| 5,728,936 A | 3/1998 | Lutz |
| 5,895,850 A | 4/1999 | Buestgens |
| 6,230,563 B1 | 5/2001 | Clark et al. |
| 6,250,156 B1 | 6/2001 | Seshia et al. |
| 6,308,567 B1 | 10/2001 | Higuchi et al. |
| 6,349,597 B1 | 2/2002 | Folkmer et al. |
| 6,520,017 B1 | 2/2003 | Schoefthaler et al. |
| 6,725,719 B2 | 4/2004 | Cardarelli |
| 6,766,689 B2 | 7/2004 | Spinola Durante et al. |
| 6,845,665 B2 | 1/2005 | Geen |
| 6,928,872 B2 | 8/2005 | Durante et al. |
| 7,155,976 B2 | 1/2007 | Kai-Cheng et al. |
| 7,322,242 B2 | 1/2008 | Merassi et al. |
| 7,398,683 B2 | 7/2008 | Lehtonen |
| 7,454,246 B2 | 11/2008 | Merfeld |
| 7,461,552 B2 | 12/2008 | Acar |
| 7,513,155 B2 | 4/2009 | Jeong et al. |
| 7,765,869 B2 | 8/2010 | Sung et al. |
| 7,797,998 B2 | 9/2010 | Menard et al. |
| 7,950,281 B2 | 5/2011 | Hammerschmidt |
| 8,020,441 B2 | 9/2011 | Seeger |
| 8,037,757 B2 | 10/2011 | Johnson |
| 8,113,050 B2 | 2/2012 | Acar et al. |
| 8,117,912 B2 | 2/2012 | Kawakubo et al. |
| 8,250,921 B2 | 8/2012 | Nasiri et al. |
| 8,256,290 B2 | 9/2012 | Mao |
| 8,312,769 B2 | 11/2012 | Coronato et al. |
| 8,342,023 B2 | 1/2013 | Geiger |
| 8,342,025 B2 | 1/2013 | Coronato et al. |
| 8,347,716 B2 | 1/2013 | Cazzaniga et al. |
| 8,347,717 B2 | 1/2013 | Seeger et al. |
| 8,353,212 B2 | 1/2013 | Hammer |
| 8,429,970 B2 | 4/2013 | Rocchi |
| 8,464,585 B2 | 6/2013 | Raman et al. |
| 8,616,057 B1 | 12/2013 | Mao |
| 8,960,002 B2 | 2/2015 | Nasiri et al. |
| 9,003,882 B1 | 4/2015 | Ayazi et al. |
| 9,010,184 B2 | 4/2015 | Zou et al. |
| 9,038,461 B2 | 5/2015 | Kanemoto |
| 9,194,704 B2 | 11/2015 | Lin et al. |
| 2002/0078746 A1 | 6/2002 | Mochida |
| 2002/0183899 A1 | 12/2002 | Wallner |
| 2002/0189351 A1 | 12/2002 | Reeds et al. |
| 2002/0189352 A1 | 12/2002 | Reeds, III et al. |
| 2002/0189353 A1 | 12/2002 | Knowles et al. |
| 2003/0131664 A1 | 7/2003 | Mochida et al. |
| 2003/0164040 A1 | 9/2003 | Willig et al. |
| 2004/0211257 A1 | 10/2004 | Geen |
| 2004/0211258 A1 | 10/2004 | Geen |
| 2005/0050954 A1 | 3/2005 | Chaumet et al. |
| 2005/0229703 A1 | 10/2005 | Geen et al. |
| 2006/0032310 A1 | 2/2006 | Merassi et al. |
| 2006/0112764 A1 | 6/2006 | Higuchi |
| 2006/0272411 A1 | 12/2006 | Acar et al. |
| 2007/0062282 A1 | 3/2007 | Akashi et al. |
| 2007/0214883 A1 | 9/2007 | Durante et al. |
| 2007/0289382 A1 | 12/2007 | Caminada et al. |
| 2008/0115562 A1 | 5/2008 | Haino et al. |
| 2008/0190200 A1 | 8/2008 | Caminada et al. |
| 2008/0276706 A1 | 11/2008 | Hartmann et al. |
| 2009/0064780 A1 | 3/2009 | Coronato et al. |
| 2009/0100930 A1 | 4/2009 | Coronato et al. |
| 2010/0037690 A1 | 2/2010 | Gunthner et al. |
| 2010/0126269 A1 | 5/2010 | Coronato et al. |
| 2010/0132463 A1 | 6/2010 | Caminada et al. |
| 2010/0149721 A1 | 6/2010 | Prandi |
| 2010/0186507 A1 | 7/2010 | Gunthner et al. |
| 2010/0192690 A1 | 8/2010 | Classen et al. |
| 2010/0307243 A1 | 12/2010 | Prandi et al. |
| 2011/0030473 A1 | 2/2011 | Acar |
| 2011/0061460 A1 | 3/2011 | Seeger et al. |
| 2011/0154898 A1 | 6/2011 | Cazzaniga et al. |
| 2012/0024056 A1 | 2/2012 | Hammer |
| 2012/0031977 A1 | 2/2012 | Havens et al. |
| 2012/0048017 A1 | 3/2012 | Kempe |
| 2012/0060604 A1 | 3/2012 | Neul et al. |
| 2012/0210789 A1 | 8/2012 | Kanemoto |
| 2013/0167636 A1 | 7/2013 | Coronato et al. |
| 2013/0174661 A1 | 7/2013 | Kuhlmann et al. |
| 2015/0059473 A1 | 3/2015 | Jia |

FOREIGN PATENT DOCUMENTS

| | | |
|---|---|---|
| EP | 1 619 471 A1 | 1/2006 |
| EP | 2 108 964 A2 | 10/2009 |
| JP | 2005-241500 A | 9/2005 |
| WO | 2006/043890 A1 | 4/2006 |
| WO | 2007/086849 A1 | 8/2007 |
| WO | 2007/145113 A1 | 12/2007 |
| WO | 2009/033915 A1 | 3/2009 |
| WO | 2009/087858 A1 | 7/2009 |

OTHER PUBLICATIONS

U.S. Appl. No. 14/149,660, filed Jan. 7, 2014, Microelectromechanical Structure with Enhanced Rejection of Acceleration Noise.

U.S. Appl. No. 14/266,676, filed Apr. 30, 2014, Microelectromechanical Gyroscope with Rotary Driving Motion and Improved Electrical Properties.

U.S. Appl. No. 14/578,255, filed Dec. 19, 2014, Integrated Microelectromechanical Gyroscope with Improved Driving Structure.

U.S. Appl. No. 14/964,469, filed Dec. 9, 2015, Microelectromechanical Device Incorporating a Gyroscope and an Accelerometer.

Schofield et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

FIG. 11

MICROELECTROMECHANICAL STRUCTURE WITH ENHANCED REJECTION OF ACCELERATION NOISE

BACKGROUND

Technical Field

The present disclosure relates to a microelectromechanical structure having enhanced mechanical characteristics for rejection of acceleration noise, in particular, the following discussion will reference, without implying any loss of generality, to a gyroscope of a microelectromechanical type.

Description of the Related Art

Micromachining techniques enable manufacturing of microelectromechanical structures or systems (MEMS) within layers of semiconductor material, which have been deposited (for example, a layer of polycrystalline silicon) or grown (for example, an epitaxial layer) on top of sacrificial layers, which are removed via chemical etching. Inertial sensors, accelerometers, and gyroscopes made with this technology are experiencing a growing success, for example, in the automotive field, in the inertial-navigation sector, or in the sector of portable devices.

In particular, integrated gyroscopes made of semiconductor material using MEMS technology are known. These gyroscopes operate on the basis of the theorem of relative accelerations, exploiting the Coriolis acceleration. When an angular velocity is applied to a mobile mass that is driven with a linear velocity, the mobile mass "feels" an apparent force, called Coriolis' force, which determines a displacement thereof in a direction perpendicular to the direction of the linear velocity and to the axis about which the angular velocity is applied. The mobile mass is supported via springs that enable a displacement thereof in the direction of the apparent force. On the basis of Hooke's law, the displacement is proportional to the apparent force in such a way that from the displacement of the mobile mass it is possible to detect the Coriolis' force and a value of the angular velocity that has generated it. The displacement of the mobile mass can, for example, be detected in a capacitive way, determining, in conditions of resonance, the variations of capacity caused by the movement of mobile electrodes, fixed with respect to the mobile mass and coupled to fixed electrodes.

MEMS gyroscopes generally have symmetrical sensing structures, comprising a pair of sensing masses for each axis of detection about which a corresponding angular velocity is detected. Ideally, an altogether symmetrical structure enables rejecting completely, by means of the use of appropriate differential reading schemes, linear noise accelerations that are applied from the outside, for example, which can be imputed to shock acting on the sensor or to the gravity acceleration. In fact, whereas the Coriolis' force tends to unbalance in opposite directions, and substantially by the same amount, the sensing masses of each pair (generating movements "in phase-opposition"), the external noise accelerations determine displacements in the same direction and again by the same amount (generating movements "in phase"). By executing the difference of the electrical signals associated to the two sensing masses of each pair, it is possible to measure the contribution due to the Coriolis' force and reject completely the noise contributions of the accelerations.

The inevitable spread of the manufacturing process, and in particular the resulting differences, even minimal, in the mechanical characteristics of the sensing masses and of the corresponding elastic supporting elements, are such that gyroscopes of a traditional type are not perfectly immune from acceleration noise coming from outside.

In fact, even though the vibration modes of the sensing masses are uncoupled and ideally at the same frequency, due to process spreads, the resonance frequencies of the two sensing masses of each pair cannot be perfectly coincident. For example, they can differ by 10-20 Hz, which causes, for high factors of merit Q, a poor rejection to the external acceleration noise. In particular, external accelerations having a frequency close to the frequencies of resonance of the sensing masses can generate responses even considerably different in the two sensing masses, thus generating a non-zero output from the corresponding reading electronics (notwithstanding the differential scheme adopted is ideally able to reject the noise). Considering that the resonance frequency of the sensing masses is usually comprised in the audio band (i.e., less than 20 kHz), it is evident that environmental noise can also generate, for the reason set forth above, even relevant noise at output.

BRIEF SUMMARY

The present disclosure provides an integrated MEMS structure that includes a driving assembly anchored to a substrate and configured to be actuated with a driving movement and a first sensing mass and a second sensing mass suspended above the substrate and coupled to the driving assembly via respective first elastic supports and configured to perform a movement of detection along a first direction of detection, in response to an external stress. The MEMS structure includes a coupling assembly to couple mechanically the first sensing mass and the second sensing mass to couple their vibration modes, that has a rigid element between the first and the second sensing masses having a point of constraint in an intermediate position between the first and second sensing masses and first and second elastic connectors to connect respective ends of the rigid element to the first and second sensing masses, the first and second elastic connectors and the rigid element being configured to present a first stiffness to a movement in phase-opposition, and a second stiffness, greater than the first stiffness, to a movement in phase of the first and second sensing masses along the first direction of detection.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
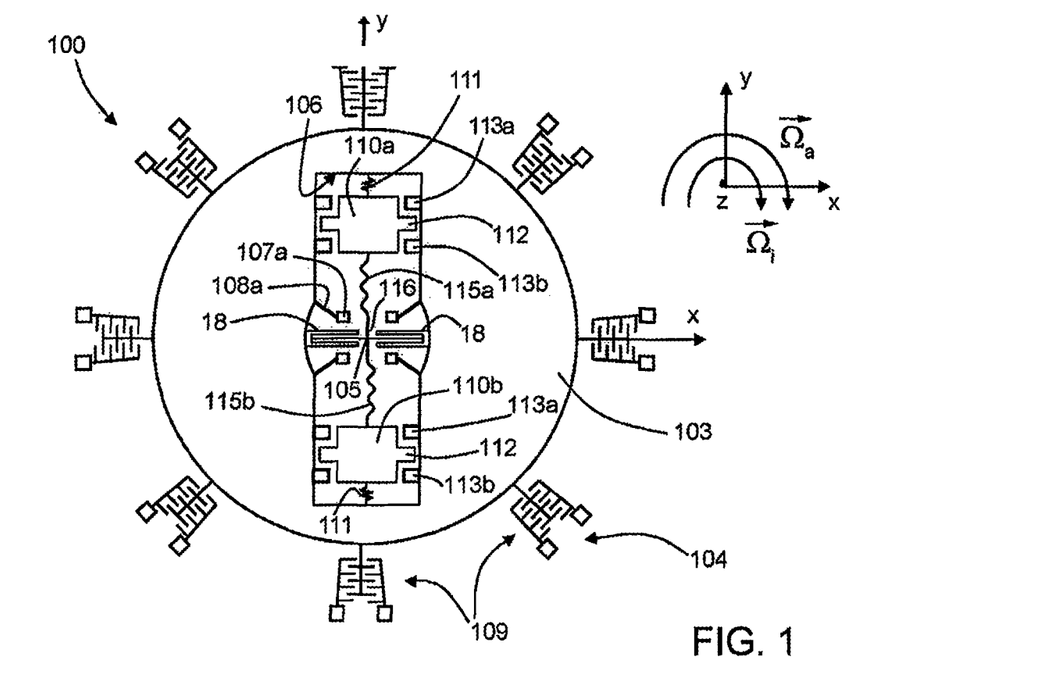
FIG. 1 shows a schematic top plan view of a microelectromechanical structure of a MEMS gyroscope, of a known type.

Italian patent application No. TO2008A000981, filed by the present Applicants on Dec. 23, 2008, describes a sensor with a microelectromechanical integrated gyroscope with rotary driving movement and sensitive to yaw angular velocities, configured to reduce the sensitivity to external acceleration noise. FIG. 1 shows an exemplary embodiment of a microelectromechanical gyroscope, designated by 100, made according to the teachings contained in the aforesaid patent application. The MEMS gyroscope 100, made starting from a die having a substrate of semiconductor material (for example, silicon), comprises a driving mass 103 and a driving assembly 104.

The driving mass 103 has a substantially planar configuration with a main extension in a plane of the sensor xy (defined by a first horizontal axis x and a second horizontal axis y, orthogonal to one another, and substantially parallel to the plane of the substrate). The driving mass 103 is negligible in size, with respect to the main extension, in a direction parallel to a vertical axis z, which forms with the first and the second horizontal axis x, y an orthogonal set of axes. The driving mass 103 defines centrally an empty space 106, a center 105 of which coincides with a centroid and a center of symmetry of the entire sensor. The driving mass 103 is anchored to the substrate by anchor elements 107a, set within the empty space 106, to which it is connected through elastic anchorage elements 108a.

The elastic anchorage elements 108a enable a rotary movement of the driving mass 103 about a driving axis passing through the center 105, parallel to the vertical axis z and perpendicular to the plane of the sensor xy, with a driving angular velocity $\vec{\Omega}_a$.

The driving assembly 104 comprises a plurality of groups of driving electrodes 109, extending outwards from the driving mass 103 in a radial direction and set at the same angular distance apart, constituted by electrodes in comb-fingered configuration. Appropriate electrical-biasing signals coming from a driving circuit (not shown), determine, by means of the mutual and alternating attraction of the electrodes, a oscillatory rotary motion of the driving mass 103 about the driving axis, at a given oscillation frequency and at the driving angular velocity $\vec{\Omega}_a$.

MEMS gyroscope 100 further comprises a pair of sensing masses 110a, 110b, arranged within the empty space 106, for the detection of yaw angular velocities $\vec{\Omega}_i$ acting about the vertical axis z. The sensing masses 110a, 110b are suspended with respect to the substrate and connected to the driving mass 103 via respective elastic supporting elements 111, in such a way as to be fixed with respect to the driving mass during its rotary driving motion, and to undergo a linear detection movement, substantially uncoupled with respect to the driving movement, in a radial direction (coinciding with the second horizontal axis y), in response to the Coriolis' force. Coupled to each of the sensing masses 110a, 110b are mobile electrodes 112, which form first and second detection capacitors with plane and parallel faces with respective first and second fixed electrodes 113a, 113b, fixed with respect to the driving mass 103.

During operation, the gyroscope 100 is able to detect the yaw angular velocity $\vec{\Omega}_i$ acting about the vertical axis z. In particular, this angular velocity generates a Coriolis' force on the sensing masses 110a, 110b directed in a radial direction (directed hence as a centripetal force acting on the same masses), causing the displacement of the sensing masses, which move in phase-opposition in the radial direction. In other words, the sensing masses move in opposite directions with respect to the radial direction and by the same amount. The value of the resulting capacitive variation of the corresponding detection capacitors is proportional to the angular velocity $\vec{\Omega}_i$, which can hence be determined, in a known manner, via a reading circuit, operating according to a differential scheme. In particular, appropriate connections are made between the fixed electrodes 113a, 113b and mobile electrodes 112 in such a way that the difference between electrical quantities correlated to the variations of the first and second detection capacitors is amplified in a differential way.

In order to reduce the noise linked to external accelerations acting on the sensing structure, which generate displacements in phase of the sensing masses 110a, 110b in the same radial direction (i.e., displacements having the same value and oriented in the same direction), the MEMS gyroscope 100 further comprises a coupling structure designed to couple the sensing masses 110a, 110b elastically to one another. The coupling structure comprises elastic coupling elements 115a, 115b, extending in the radial direction, each, starting from a respective one of the sensing masses 110a, 110b, and connected to one another via a connection element 116, set in a central position, for example, in a position corresponding to the center 105. The connection element 116 is configured to have substantially negligible weight and dimensions, in particular as compared with those of the sensing masses and of the elastic elements. The connection element 116 is also connected to the driving mass 103 via further elastic supporting elements 118, which extend in a direction transverse to the radial direction of the sensing masses (along the first horizontal axis x).

The elastic coupling elements 115a, 115b have, during operation, the function of coupling the vibration modes of the sensing masses 110a, 110b, and of giving rise to two different separate vibration modes of the resulting mechanical sensing structure. In particular, a first vibration mode, in phase and a second vibration mode, in phase-opposition are generated having frequencies of resonance clearly separate from one another. In either case, the two sensing masses 110a, 110b vibrate at the same frequency (irrespective of any possible process spread). It is consequently easy, via the reading electronics, to reject the vibration mode in phase linked to the noise accelerations, and preserve, for the subsequent processing, just the vibration mode in phase-opposition representing the angular accelerations to be detected.

From the mechanical standpoint, the aforesaid two different vibration modes derive from the different modes of displacement of the sensing masses 110a, 110b, during the movement in phase or in phase-opposition. In particular, during the movement in phase-opposition, the displacement of the sensing masses 110a, 110b arises both from the deformation of the elastic coupling elements 115a, 115b and from the deformation of the elastic supporting elements 111, so that the connection element 116 remains substantially stationary in a central position. During the movement in phase, the elastic coupling elements 115a, 115b undergo a smaller deformation with respect to the motion in phase-opposition, moreover the further elastic supporting elements 118 (which in the motion in phase-opposition were substantially stationary) undergo deformation, and the connection element 116 is displaced in the radial direction. There follows a stiffness and a natural frequency of the mode in phase that is sensibly smaller than the natural frequency of the mode in phase-opposition (the stiffness of the structure is hence as a whole reduced).

Figure 2A:
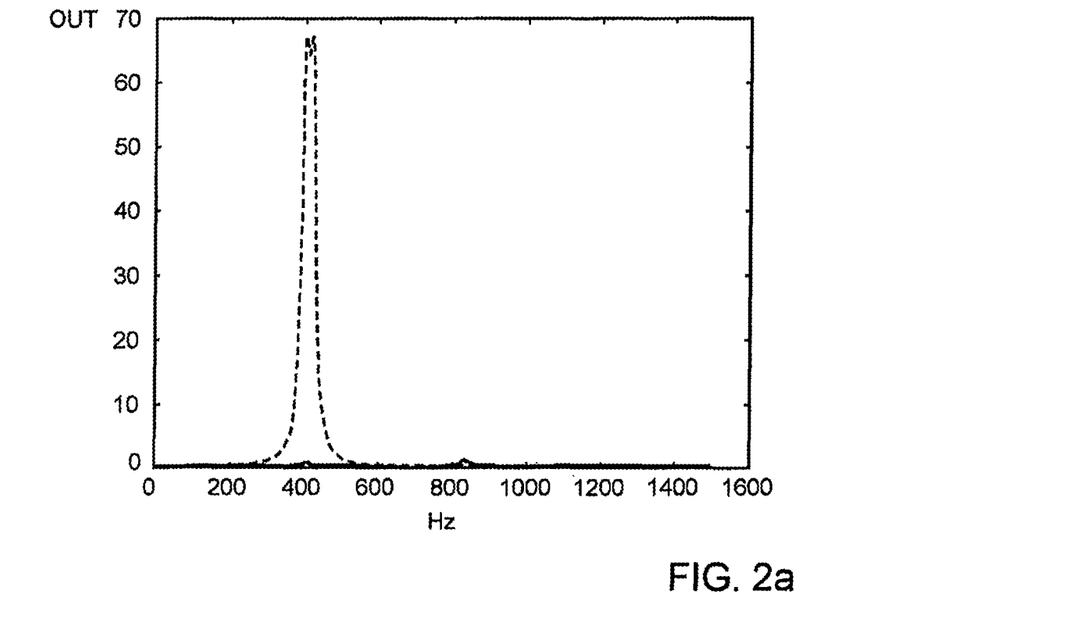
FIGS. 2a, 2b show plots of electrical quantities corresponding to the gyroscope of FIG. 1.
Figure 2B:
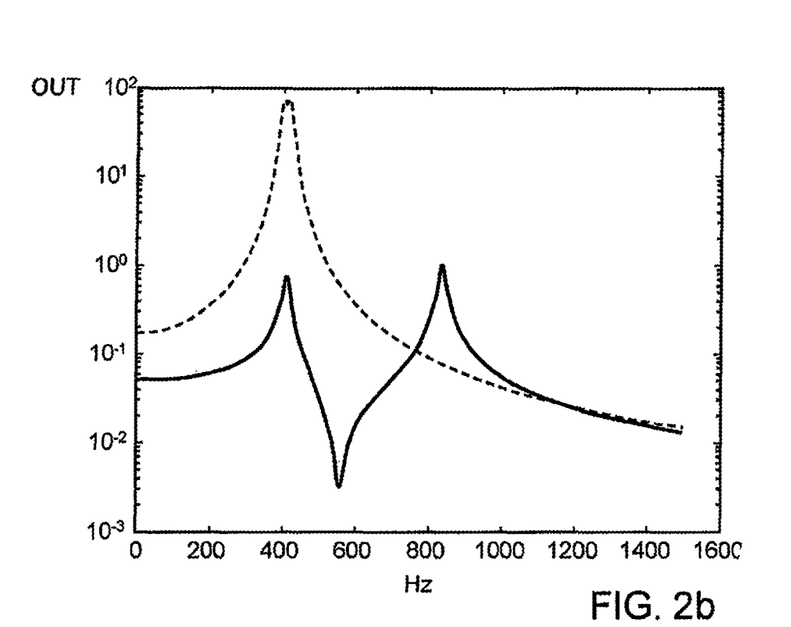

FIGS. 2a and 2b show results of a numeric processing, which sets in direct comparison the values obtained with the MEMS gyroscope 100 of FIG. 1 (solid line) with the values obtained with a traditional structure of a known type (dashed line), without elastic coupling between the sensing masses. In particular, in this numeric processing a process spread has been simulated applying a difference of 1% in the stiffness of the elastic supporting elements associated to the sensing masses, and a random noise of displacement has been applied to the constraints of the same sensing masses (to simulate an external acceleration noise). FIGS. 2a and 2b show, respectively in linear and logarithmic scale, the signal at output from the reading electronics of the gyroscope (and hence the result of the operations of amplification and demodulation, of a known type, of the electrical quantities at output from the detection capacitors).

From these plots, the presence of two distinct frequency peaks set at a distance of approximately 20 Hz may be noted, due to the different resonance frequency of the two sensing masses. When they are not coupled; it is also evident that an output from the reading electronics that is non-zero is present and has a significant value in the presence of a noise acceleration (having values that can even be comparable with the values assumed during detection of angular accelerations). Instead, the coupling of the vibration modes of the sensing masses 110a, 110b generates at output two contributions of noise at frequencies clearly separate from one another: one, corresponding to the vibration in phase-opposition, has a frequency approximately twice the other, for the vibration in phase. In addition, this coupling enables reduction of the output of the gyroscope, in response to an external noise acceleration, approximately 100 times than that obtained with a traditional solution (without coupling between the sensing masses).

The above embodiment finds immediate application for sensing masses for detecting yaw angular velocities, in structures (possibly also inserted within multiaxial sensors) that envisage a motion of the sensing masses of translation in a plane along one and the same axis.

One embodiment of the present disclosure provides a mechanical coupling of sensing masses 10a, 10b of a MEMS gyroscope 1 in a sensor structure to couple their vibration modes and to reject the acceleration noise. The coupled sensing masses are moreover suited for application in biaxial and triaxial sensor structures and for the detection of pitch and roll angular accelerations.

Figure 3:
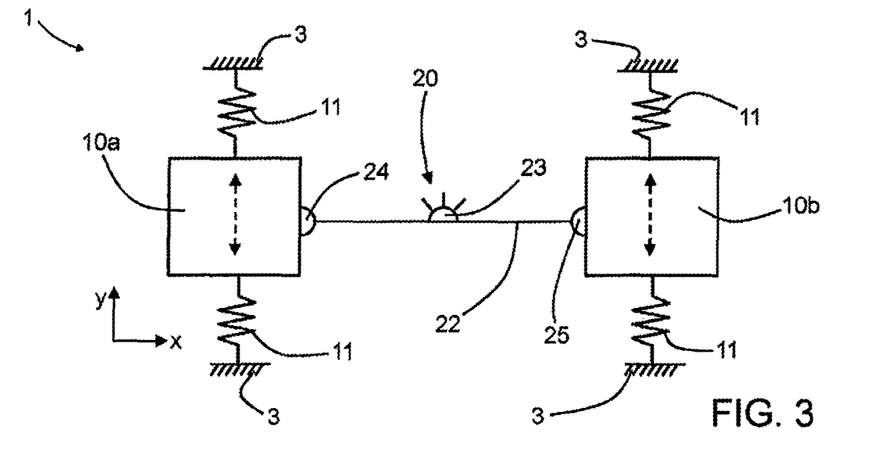
FIG. 3 shows a schematic top plan view of a coupling structure between sensing masses with movement of translation of a MEMS gyroscope according to one aspect of the present disclosure.

In detail, and with reference to the schematic representation of FIG. 3, a top plan view of a portion of the sensor structure, a driving movement is a translation in a direction of a first horizontal axis x of a plane of the sensor xy (coinciding with a plane of main extension of the structure). The movement of detection executed by the sensing masses 10a, 10b as a function of the resulting Coriolis' force occurs in a direction of a second horizontal axis y (as illustrated schematically by the double-headed arrow).

The sensing masses 10a, 10b (constituting a pair of sensing masses for detecting the yaw angular acceleration about a vertical axis z, orthogonal to the plane of the sensor xy) are connected to a driving structure 3 (here illustrated schematically) via respective elastic supporting elements 11.

The sensing masses 10a, 10b are in this case mechanically coupled by a coupling structure 20, which comprises a rigid connection element 22. For example, a rod made of the same semiconductor material of which the sensing masses are made. The rigid connection element 22 having a first end connected to a first sensing mass 10a of the pair and a second end, opposite to the first, connected to a second sensing mass 10b of the pair. The rigid connection element 22 also having at a portion thereof intermediate between the sensing masses, for example, a central portion that is a point of constraint with respect to the movement of detection and that is forced to remain substantially immobile with respect to translation during the movement of the sensing masses.

The rigid connection element 22 extends (in this case, along the first horizontal axis x) in a direction transverse with respect to the direction of the movement of detection of the sensing masses 10a, 10b. In addition, the rigid connection element 22 can be ideally considered infinitely rigid with respect to bending.

The coupling structure 20 includes a first coupling element 23, designed to constrain the aforesaid intermediate portion of the rigid connection element 22 to the substrate of the MEMS gyroscope 1 in a position corresponding to the aforesaid point of constraint. A second coupling element 24, designed to connect elastically the first end of the rigid connection element 22 to the first sensing mass 10a. A third coupling element 25, designed to connect elastically the second end of the rigid connection element 22 to the second sensing mass 10b.

In particular, the first, second, and third coupling elements 23, 24, 25 are configured to hinge ideally the rigid connection element 22 centrally to the substrate, and at its ends to the sensing masses 10a, 10b. Each of the coupling elements consequently performing substantially the function of a hinge that is assumed ideally as not having any torsional stiffness and as not being compliant (i.e., having an infinite stiffness) with respect to translation. The coupling elements 23, 24, 25 are configured so as to enable rotations, but not translations, of the rigid connection element 22 with respect to the point of constraint with the substrate or to the sensing masses.

During operation, the presence of the second and third coupling elements 24, 25 at the end portions of the rigid connection element 22 enables the sensing masses 10a, 10b to oscillate in phase-opposition at a frequency determined uniquely by the elastic supporting elements 11 with which they are connected to the driving mass 3. In particular, the sensing masses 10a, 10b perform, during the motion in phase-opposition, displacements of the same amount and in opposite directions along lines parallel to one another and to the second horizontal axis y, at a distance determined substantially by the length extension of the rigid connection element 22. During this motion in phase-opposition, the second and third elastic coupling elements 24, 25 undergo elastic deformation, whilst the rigid connection element 22 rotates rigidly in the plane of the sensor xy about its intermediate point of constraint.

In addition, the presence of the first coupling element 23 at the central portion of the rigid connection element 22 and of the associated point of constraint to the substrate, substantially prevents the movement in phase of the sensing masses 10a, 10b, given the substantially infinite rigidity to the translation (in this case in the direction of the second horizontal axis y) of the aforesaid first coupling element 23, and to the stiffness to bending of the same rigid connection element 22. Basically, it is as if the natural frequency of the in-phase mode of oscillation tended to infinity, with the result of defining a mechanical system with a single degree of freedom and hence with a single natural frequency (the useful one of the mode in phase-opposition).

The coupling structure 20 previously described applies in a substantially similar manner in the case where the motion of the sensing masses 10a, 10b, enabled by the elastic supporting elements 11, is not a translation, but a rotation out of the plane of the sensor xy. As will be described in detail in what follows, this movement of detection is associated to the detection of angular accelerations of pitch and/or roll about the first horizontal axis x and the second horizontal axis y, respectively of the plane of the sensor xy.

Figure 4:
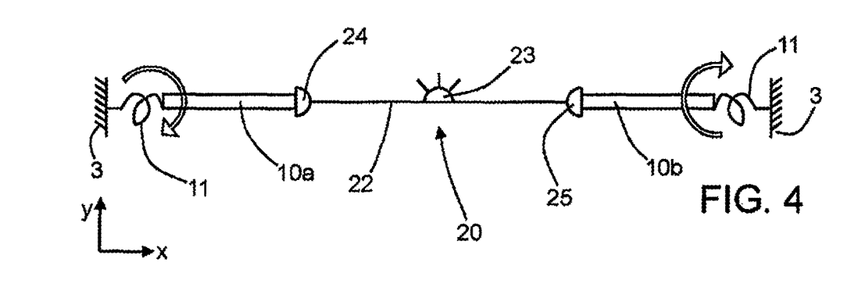
FIG. 4 shows a side view of a coupling structure between sensing masses with movement of rotation of a MEMS gyroscope according to a further aspect of the present disclosure.

With reference to the schematic representation of FIG. 4, which shows laterally the sensing structure in a cross section through the plane of the sensor xy parallel to the substrate, the driving movement is a translation in the direction of the first horizontal axis x of the plane of the sensor xy. The movement of detection of the sensing masses 10a, 10b is caused by the resulting Coriolis' force and is in this case represented by rotations in phase-opposition (i.e., in the opposite direction and by the same amount) of the sensing masses out of the plane xy about an axis defined by the elastic supporting elements 11.

Also in this case, the movement in phase-opposition of the sensing masses 10a, 10b is enabled by the rotation of the rigid connection element 22 about the point of constraint and out of the plane of the sensor xy. The movement in phase-opposition of the sensing mass is also enabled by the elastic deformation of the coupling elements 24, 25 and the movement in phase of the same sensing masses is hindered by the impossibility of the rigid connection element 22 of translating with respect to the point of constraint, in this case in the direction of the vertical axis z, and by the stiffness to bending of the rigid connection element 22.

As will be described in detail hereinafter, it is also possible to combine the two solutions illustrated so as to provide the coupling of the various pairs of sensing masses in the case of biaxial sensors (with detection of the pairs of angular velocities of pitch and roll, pitch and yaw, or roll and yaw) or in the case of triaxial sensors (with detection of the angular velocities of pitch, roll, and yaw).

The coupling structure 20 is obtained using elements that have not, of course, infinite stiffness. In addition, the torsional stiffness of the coupling elements 23, 24, 25 cannot be zero. Consequently, the spurious frequency (associated to the motion in phase) does not tend to infinity, but to a high, but finite value. In addition, the presence of the coupling structure 20 leads also to an increase in the frequency of the useful vibration mode (motion in phase-opposition), with respect to the case with uncoupled masses. With an adequate sizing of the coupling structure 20 it is possible in any case, with a given natural frequency of the useful mode, to reach very high values of spurious frequency and thus obtain a good separation of the vibration modes.

Figure 5A:
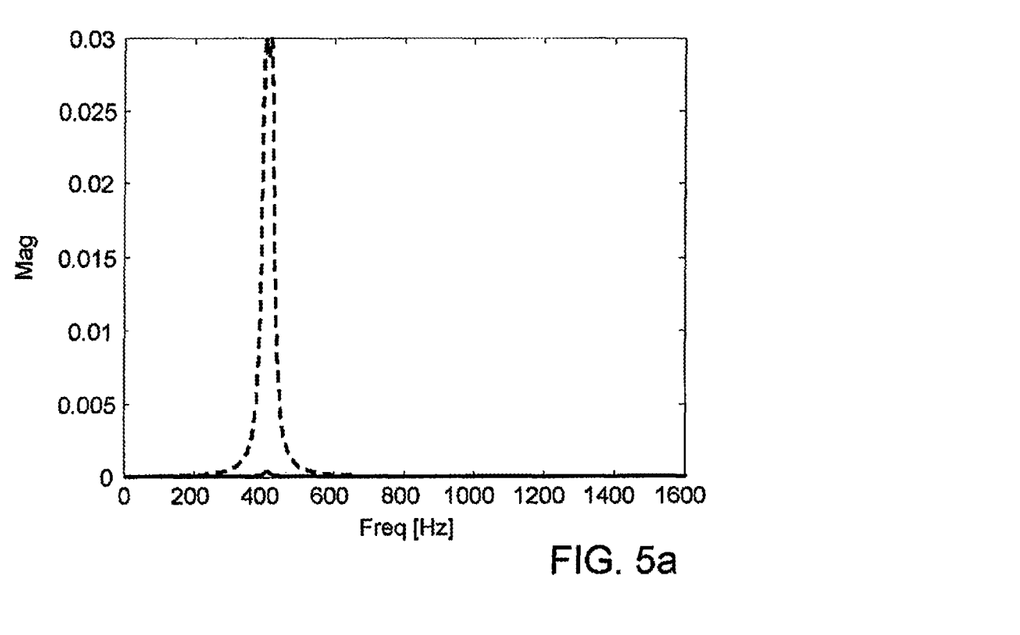
FIGS. 5a, 5b show plots of electrical quantities corresponding to the MEMS gyroscope of FIG. 3 or FIG. 4.
Figure 5B:
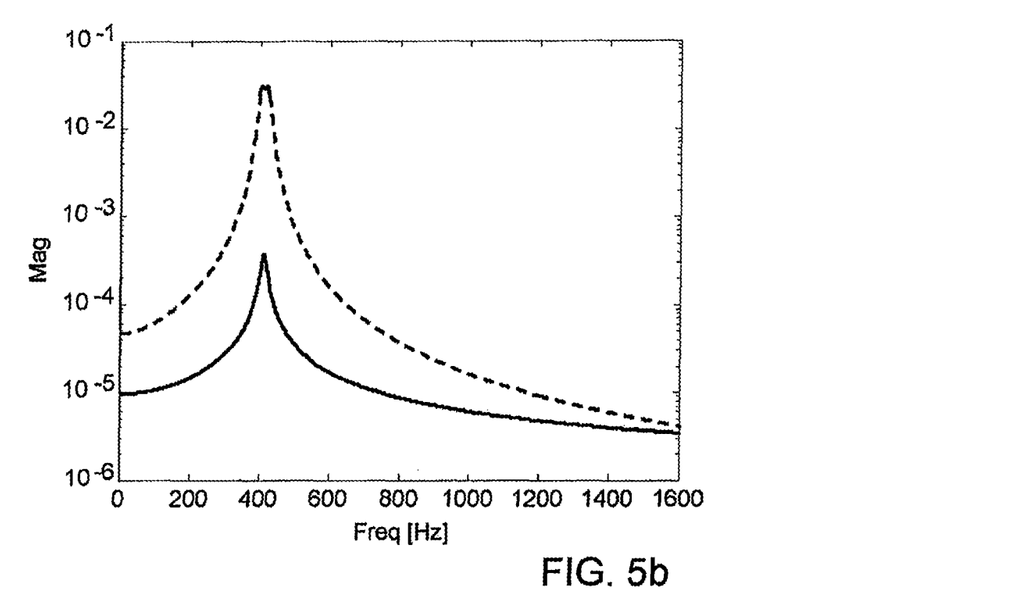

For example, FIGS. 5a, 5b show the result of a numeric processing similar to the one previously described with reference to FIGS. 2a, 2b, setting directly in comparison the values obtained with the coupling structure 20 (solid line) with the values obtained in a structure with uncoupled sensing masses (in dashed). From the plots an evident decrease of the sensitivity of the gyroscope to the external acceleration noise may be noted, and moreover the presence (in the shown frequency band) of a single peak (equal to approximately 400 Hz), corresponding to the natural frequency of the motion in phase-opposition (signal useful for detection). The spurious frequency of the motion in phase is in fact displaced to far higher frequencies (higher than the frequency band highlighted, i.e., higher than 1600 Hz).

Some examples of layout of uniaxial, biaxial, or triaxial microelectromechanical gyroscopes will now be illustrated, implementing the coupling structure 20 between the corresponding sensing masses.

In particular, in these examples, in order to implement each of the coupling elements 23, 24, 25 (having functions of a hinge at the respective hinge point) the solution is adopted consisting in the use of two springs having a rectilinear extension set, one as a prolongation of the other in a direction transverse to the direction of extension of the rigid coupling element 22. Starting from the respective hinge point, so as to operate in bending-in-the-plane (the plane of the sensor) or torsion during the motion in phase-opposition of the sensing masses, and to operate in tension/compression or bending-out-of-the-plane (again, the plane of the sensor) during the motion in phase. The behavior of this pair of flexible elements approximates very well that of a hinge positioned in the point of contact of the ends in common of the rectilinear springs, if the rectilinear springs have a stiffness with respect to the deformations of tension/compression/bending-out-of-the-plane much greater than the stiffness with respect to the deformations of bending-in-the-plane/torsion.

Figure 6A:
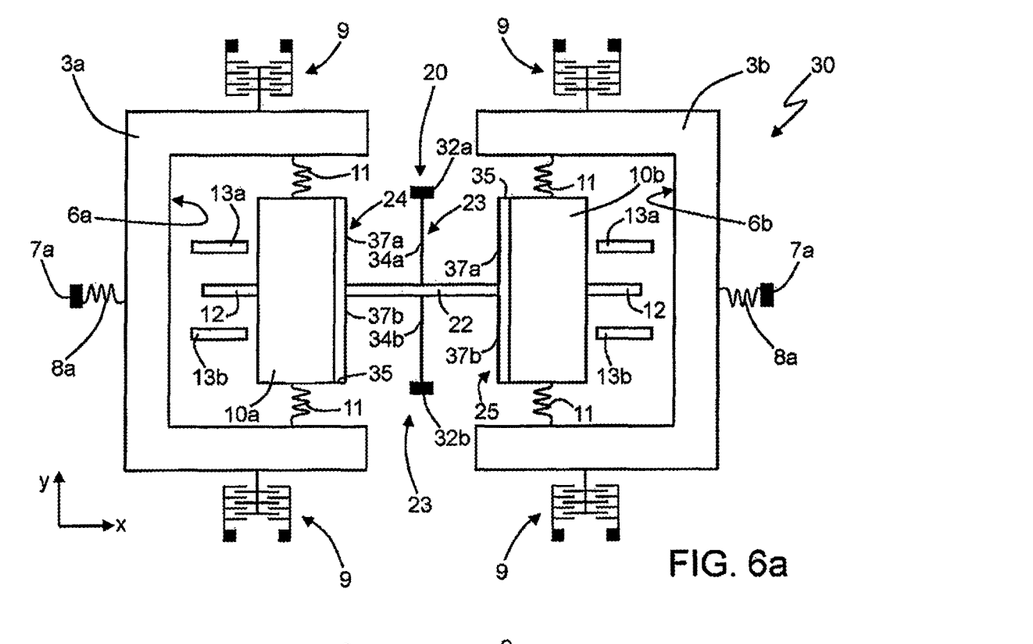
FIG. 6a shows a schematic top plan view of a uniaxial MEMS gyroscope according to a first embodiment of the present disclosure.

FIG. 6a shows a first embodiment of a MEMS gyroscope 30, of a uniaxial type, sensitive to yaw angular velocities. In this figure, as in the subsequent ones, similar reference numbers are used to designate elements similar to other ones already described.

The MEMS gyroscope 30 has a structure symmetrical with respect to the second horizontal axis y, comprising a first, substantially C-shaped, driving mass 103a and a second driving mass 3b substantially shaped like a reversed C, arranged facing one another and defining internally a respective empty space 6a, 6b.

The driving masses 3a, 3b are anchored to the substrate (not illustrated herein) of the semiconductor-material die in which the MEMS gyroscope 30 is made, by anchorage means 7a set externally to the respective empty space 6a, 6b, to which they are connected by means of elastic anchorage elements 8a extending along the first horizontal axis x. The driving masses 3a, 3b are actuated by respective sets of driving electrodes 9 (in comb-fingered configuration) in such a way as to generate a driving movement of translation in the direction of the first horizontal axis x.

The MEMS gyroscope 30 further comprises the first sensing mass 10a and the second sensing mass 10b, each arranged in the respective empty space 6a, 6b inside the respective driving mass 3a, 3b. The first and second sensing masses 10a, 10b are connected by means of elastic supporting elements 11 extending along the second horizontal axis y. The elastic supporting elements 11 are configured in such a way that the sensing masses 10a, 10b are dragged by the respective driving mass 3a, 3b during the driving movement, and also perform a movement of detection, uncoupled from the driving movement, in particular a movement of translation along lines parallel to one another and to the second horizontal axis y. The sensing masses 10a, 10b have a substantially rectangular shape, elongated in a direction of the second horizontal axis y, and are connected to respective mobile electrodes 12, extending laterally from them along the first horizontal axis x. The mobile electrodes 12 form detection capacitors with plane and parallel faces with respective first and second fixed electrodes 13a, 13b, anchored (in a way not illustrated) to the substrate, so as to be immobile with respect to the movement of detection of the sensing masses 10a, 10b.

The rigid connection element 22 of the coupling structure 20 extends between the first and the second sensing mass 10a, 10b along the first horizontal axis x, in a direction transverse to the direction of the aforesaid movement of detection, with the central portion thereof hinged to the substrate. In particular, the central portion is connected to a first constraint anchorage 32a by means of a first rectilinear spring 34a, extending along the second horizontal axis y. The central portion is also connected to a second constraint anchorage 32b by means of a second rectilinear spring 34b, which also extends along the second horizontal axis y, as a prolongation of the first rectilinear spring 34a, starting from the aforesaid central portion. As will be illustrated hereinafter, the constraint anchorages 32a, 32b are pillars made of semiconductor material extending from the substrate as far as the plane of the sensor xy.

The first and second rectilinear spring 34a, 34b form the first coupling element 23 of the coupling structure 20, with the function to hinge the rigid connection element 22 to the substrate (the rectilinear springs 34a, 34b have in fact a stiffness to tension/compression much greater than the stiffness with respect to bending-in-the-plane).

The second and third coupling elements 24, 25 are also constituted by a pair of rectilinear springs 37a, 37b extending along the second horizontal axis y as a prolongation of one another starting from, and on opposite sides of, the rigid connection element 22. The ends of the rectilinear springs 37a, 37b that are not in common are connected to corresponding end portions of the respective sensing masses 10a, 10b by connecting portions 35, transverse to the springs 37a, 37b and extending along the first horizontal axis x.

Figure 6B:
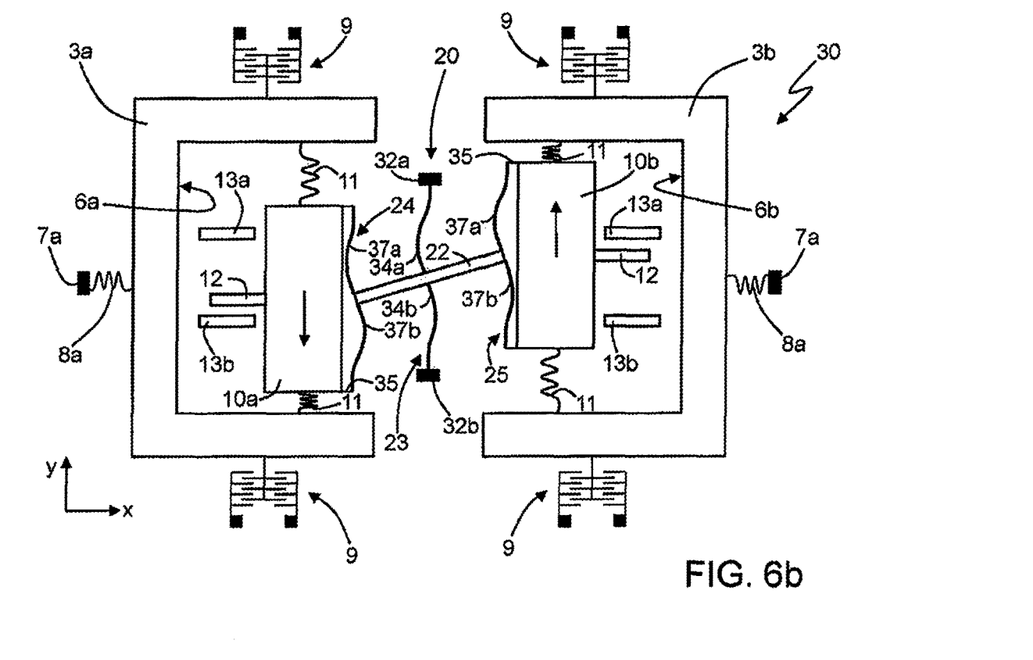
FIG. 6b shows a schematic top plan view of the MEMS gyroscope of FIG. 6a, and the deformation of corresponding elastic elements, during detection of a yaw angular velocity.

During operation, as illustrated in FIG. 6b, due to the driving movement of the driving masses 3a, 3b along the first horizontal axis x, and in the presence of a yaw angular velocity to be detected, a Coriolis' force is generated on the corresponding sensing masses 10a, 10b, directed in opposite directions (as highlighted by the arrows) along the second horizontal axis y. In the resulting motion in phase-opposition, the sensing masses 10a, 10b move by the same amount in opposite directions along the second horizontal axis y, causing deformation in torsion/bending of the first, second, and third coupling elements 23, 24, 25, and the rotation of the rigid connection element 22 in the plane of the sensor xy about the hinge point/constraint (in particular, about an axis parallel to the vertical axis z and passing through said hinge point/constraint).

Instead, an external acceleration noise, which would tend to move the sensing masses 10a, 10b by the same amount and in the same direction of the second horizontal axis y, is in actual fact countered by the presence of the constraint to the substrate of the rigid connection element 22, which is constrained, with respect to the translation in the plane of the sensor xy along the same second horizontal axis y, by the presence of the respective rectilinear springs 37a, 37b (in other words, being substantially immobile with respect to this translation).

Figure 7A:
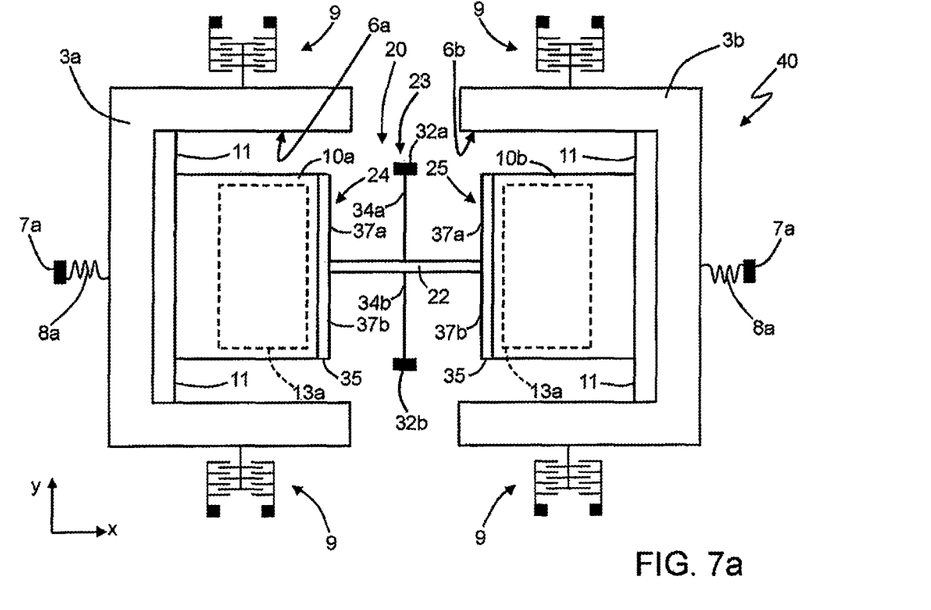
FIG. 7a shows a schematic top plan view of a uniaxial MEMS gyroscope in accordance with a second embodiment of the present disclosure.

FIG. 7a shows a second embodiment of the present disclosure, corresponding to a MEMS gyroscope 40, which is able to detect roll angular velocities, having sensing masses that rotate out of the plane of the sensor xy (moving in the direction of the vertical axis z, if the small oscillations are considered).

This embodiment differs from the previous one, for a different configuration of the sensing masses 10a, 10b that rotate out of the plane of the sensor xy about the axis defined by the elastic supporting elements 11, herein constituted by rectilinear elements extending along the second horizontal axis y coupled to an end portion of the respective sensing mass 10a, 10b, on opposite sides with respect to the first horizontal axis x. A respective fixed electrode, herein designated by 13a, is set underneath each sensing mass 10a, 10b and on top of the substrate; the same sensing masses 10a, 10b constitute herein the mobile electrode facing the fixed electrode 13a. The sensing masses 10a, 10b hence extend in cantilever fashion above the respective fixed electrode 13a and the substrate, starting from the respective elastic supporting elements 11.

During operation, due to the driving movement of the driving masses 3a, 3b along the first horizontal axis x and in the presence of a roll angular velocity about the second horizontal axis y, a Coriolis' force is generated on the corresponding sensing masses 10a, 10b, oriented in the direction of the vertical axis z.

Figure 7B:
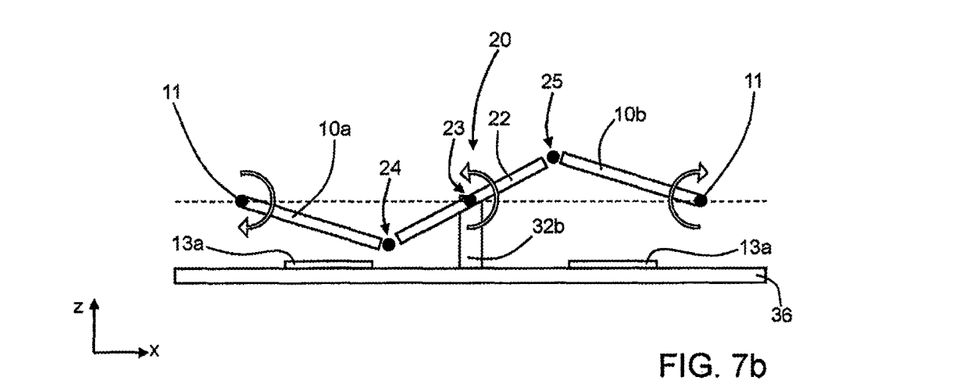
FIG. 7b shows a schematic top plan view of the MEMS gyroscope of FIG. 7a, and the deformation of corresponding elastic elements, during the detection of a roll angular velocity.

As illustrated in FIG. 7b (which shows the deformation of the structure during the motion in phase-opposition), the sensing masses 10a, 10b rotate out of the plane of the sensor xy, by the same amount and in opposite directions (moving away from, or approaching, the substrate, herein designated by the reference number 36, and the respective fixed electrode 13a). Again, this movement of detection is enabled by the deformation in torsion of the first, second, and third coupling elements 23, 24, 25. During this motion in phase-opposition, the rotation of the rigid connection element 22 out of the plane xy also occurs, about the point of constraint (in this case, about an axis parallel to the second horizontal axis y extending along the rectilinear springs 34a, 34b). In FIG. 7b, it is also illustrated the constraint anchorage 32b, coupled to the substrate 36, shaped like a pillar extending vertically starting from the substrate 36 as far as the plane of the sensor xy, and at which the rectilinear springs 34a, 34b are arranged.

Instead, noise accelerations do not ideally produce any displacement of the sensing masses 10a, 10b; the displacement of translation in the vertical direction z of the rigid connection element 22 is in fact hindered by the stiffness to bending-out-of-the-plane of the first coupling element 23, which constrains the rigid connection element 22 to the substrate 36, as well as by the stiffness to bending of the same rigid connection element 22.

Figure 8:
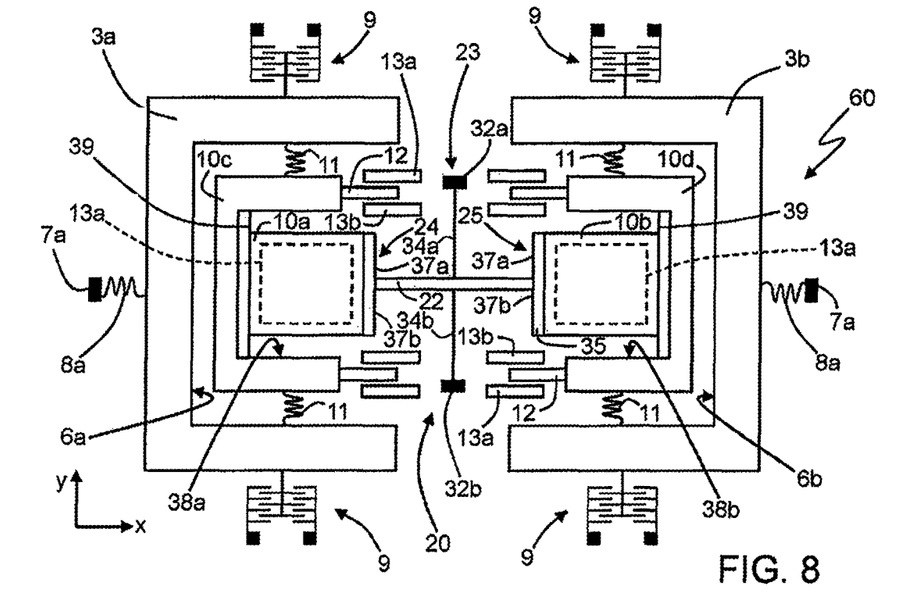
FIG. 8 shows a schematic top plan view of a biaxial MEMS gyroscope according to a third embodiment of the present disclosure, which is able to detect angular velocities of yaw and roll.

FIG. 8 shows a third embodiment of the present disclosure, corresponding to a MEMS gyroscope 60 of a biaxial type, which is able to detect in a substantially uncoupled way, angular velocities about an axis of yaw and an axis of roll, combining the sensing structures previously described individually.

For this purpose, within the empty space 6a, 6b of each driving mass 3a, 3b, two sensing masses are present (so as to form two pairs of sensing masses, one pair for each axis of detection), one arranged so as to translate in a direction in the plane of the sensor xy (in particular, along the second horizontal axis y), and the other arranged so as to rotate out of the same plane of the sensor xy.

In detail, sensing masses 10c, 10d of a second pair (designed for detection of yaw angular velocities) are connected directly to the respective driving mass 3a, 3b by means of the elastic supporting elements 11, and are shaped like a C (or like a reversed C), defining internally a further empty space 38a, 38b. Associated to each of these sensing masses 10c, 10d are mobile electrodes 12, comb-fingered to fixed electrodes 13a, 13b, in a substantially similar manner as what described previously.

The sensing masses 10a, 10b of the first pair (designed for the detection of roll angular velocities) are each arranged in the respective empty space 38a, 38b defined by a corresponding sensing mass 10c, 10d of the second pair, and are connected thereto by means of further elastic supporting elements 39. The sensing masses 10a, 10b are hence connected to the respective driving mass 3a, 3b via the interposition of a corresponding sensing mass 10c, 10d of the second pair (an appropriate rigidity of the further elastic supporting elements 39, with respect to the driving motion, is provided for this purpose). As described previously, the sensing masses 10a, 10b of the first pair extend in cantilever fashion from the respective elastic supporting elements 39, and face respective fixed electrodes 13a set on top of the substrate 36 (not shown).

The coupling structure 20, made in a way substantially similar to what was described previously, is in this case connected directly to the sensing masses 10a, 10b of the first pair, and, via these, indirectly to the sensing masses 10c, 10d of the second pair (and there is for this purpose provided an appropriate rigidity of the further elastic supporting elements 39 to the motion of translation of the sensing masses 10c, 10d of the second pair).

During operation, a yaw angular velocity determines a Coriolis' force oriented in the direction of the second horizontal axis y and a consequent movement of translation of the sensing masses 10c, 10d of the second pair, which draw along rigidly in said movement also the sensing masses 10a, 10b of the first pair (this movement is enabled by the deformation in bending-in-the-plane of the elastic elements of the coupling structure 20). In a similar way, a roll angular velocity determines a Coriolis' force oriented in the direction of the vertical axis z and a consequent movement of rotation out of the plane of the sensor xy of the sensing masses 10a, 10b of the first pair (this movement is again enabled by the deformation, in torsion, of the elastic elements of the coupling structure 20). External noise accelerations, for reasons similar to what has been illustrated previously, do not determine, instead, appreciable displacements of the sensing masses 110a, 110b and 110c, 110d of each pair, given the presence of the constraint to the substrate 36 of the rigid connection element 22, in an intermediate position between the sensing masses, and to the rigidity of the same rigid connection element 22.

Figure 9:
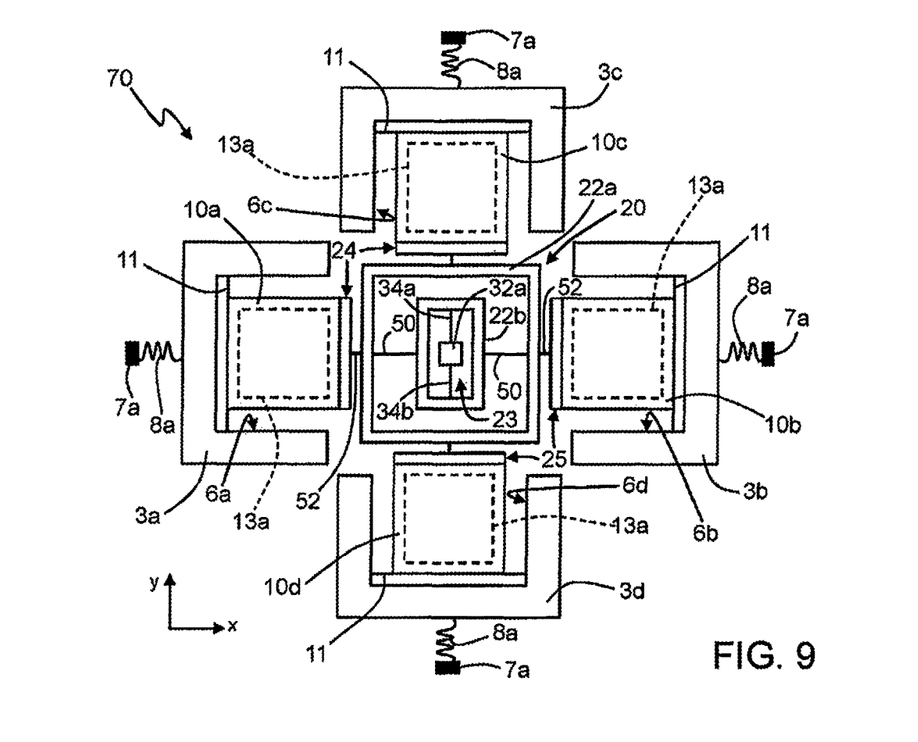
FIG. 9 shows a schematic top plan view of a biaxial MEMS gyroscope according to a fourth embodiment of the present disclosure, which is able to detect angular velocities of pitch and roll.

A fourth embodiment of the present disclosure, illustrated in FIG. 9, implements a MEMS biaxial gyroscope 70, sensitive to angular velocities about the axis of roll and the axis of pitch.

Also in this case, two pairs of sensing masses 10a, 10b and 10c, 10d are hence present (one pair of masses for each axis of detection), all arranged (in a manner corresponding to what was described previously) so as to be able to rotate out of the plane of the sensor xy, about respective elastic supporting elements 11 connected to corresponding driving masses 3a, 3b and 3c, 3d (in this case, four in number, one for each sensing mass). The MEMS gyroscope 70 has a resulting structure that is symmetrical both with respect to the first horizontal axis x and with respect to the second horizontal axis y; the pair of sensing masses 10a, 10b and driving masses 3a, 3b corresponding to the roll axis are arranged aligned along the first horizontal axis x, whilst the pair of sensing masses 10c, 10d and of driving masses 3c, 3d corresponding to the pitch axis are arranged aligned along the second horizontal axis y, with an overall crosswise arrangement of the various masses.

For coupling together the sensing masses of the two pairs, it is in this case provided a different configuration of the coupling structure 20, set at the center of the aforesaid cross defined by the sensing and driving masses.

In particular, the rigid connection element 22 comprises herein a first frame element 22a, having side portions parallel in pairs to the horizontal axes x and y, and a second frame element 22b, set internally with respect to the first frame element 22a (parallel thereto). The side portions both of the first frame element 22a and of the second frame element 22b are constituted by rigid elements (for example, beams made of semiconductor material). The side portions parallel to the second horizontal axis y of the first frame element 22a are connected to corresponding side portions (again parallel to the second horizontal axis y) of the second frame element 22b by means of substantially elastic connection elements 50, directed along the first horizontal axis x; moreover, the side portions parallel to the first horizontal axis x of the second frame element 22b (set more internally) are hinged to the substrate 36 by means of a single constraint anchorage, herein designated by 32a, to which they are connected by means of respective rectilinear springs 34a, 34b (parallel to the second horizontal axis y), constituting the first coupling element 23. The side portions of the first frame element 22a (set more externally) are moreover coupled to respective sensing masses 10a-10d by means of respective second and third coupling elements 24, 25 (for a total of four coupling elements, one for each sensing mass), to which they are connected by means of further connection elements 52, also substantially elastic and directed along the first or second horizontal axis x, y.

During operation, the rotation movements in phase-opposition of the sensing masses 10a-10b, 10c-10d of the two pairs are transmitted to the first frame element 22a by the second and third coupling elements 24, 25, and, via the connection elements 50, are transmitted to the second frame element 22b, with an associated deformation of the rectilinear springs 34a, 34b of the first coupling element 23. Instead, the rotation movements in phase of the same sensing masses, due to noise accelerations, do not cause appreciable displacements, given the rigidity to translation of the entire coupling structure 20 (and, in particular, of the rectilinear springs 34a, 34b associated to the constraint anchorage 32a).

Figure 10:
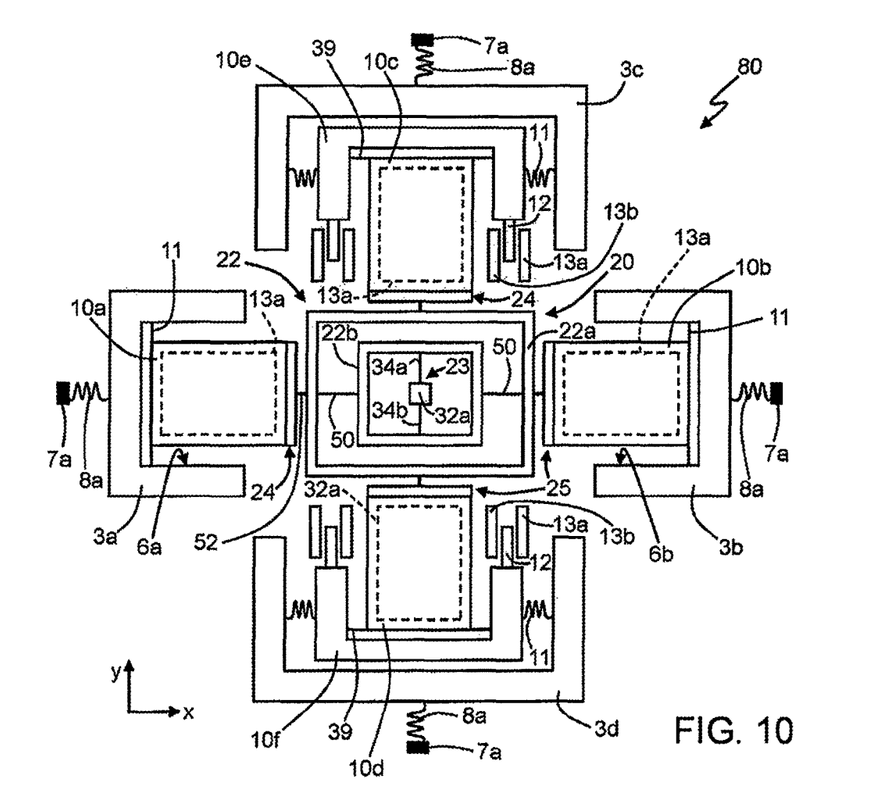
FIG. 10 shows a schematic top plan view of a triaxial MEMS gyroscope according to a fifth embodiment of the present disclosure, which is able to detect angular velocities of yaw, pitch, and roll.

A fifth embodiment of the present disclosure, illustrated in FIG. 10, uses a coupling structure 20 substantially similar to the one illustrated in FIG. 9 and sensing structures similar to the ones described previously, to provide a triaxial MEMS gyroscope 80, sensitive to angular velocities about the axis of yaw, as well as the axes of roll and pitch.

In this case, four driving masses 3a-3d and three pairs of sensing masses (10a-10b, 10c-10d and 10e-10f) are present, each corresponding to a respective axis of detection of the MEMS gyroscope 80. In particular, with respect to the solution illustrated in FIG. 9, there is a further pair of C-shaped sensing masses 10e-10f, arranged externally to the sensing masses 10c-10d corresponding to the axis of pitch, and elastically connected to them substantially as described with reference to the third embodiment of FIG. 8 (equivalently, the third pair of sensing masses could be set along the first horizontal axis x, externally to the sensing masses 10a, 10b corresponding to the axis of roll).

Applying the principles highlighted previously, it is immediately possible to verify that this structure enables detection of the movements in phase-opposition of the sensing masses corresponding to the angular velocities of yaw, roll or pitch, substantially preventing the movements in phase of the same sensing masses (and thus enabling rejection of the noise accelerations).

The advantages of the microelectromechanical gyroscope made according to the present disclosure are clear from the foregoing description.

In particular, it is again emphasized that the particular solution for mechanical coupling of the sensing masses for sensing the angular velocities enables rejection of the external acceleration noise (for example, due to environmental noise or other form of noise), also in the presence of manufacturing process spreads.

The present coupling solution can be used for coupling sensing masses corresponding to a number of axes (yaw, roll, pitch) simultaneously; the present coupling solution is in fact advantageously applicable also in biaxial or triaxial gyroscopes, enabling in fact the integration with sensing structures for sensing pitch and/or roll angular accelerations.

This solution also envisages a separation of the resonance frequencies of detection such as to displace the undesired vibration mode (i.e., the one in which the sensing masses oscillate in phase) to a higher frequency with respect to the vibration mode useful for detection (oscillation in phase-opposition), the two frequencies being in any case very distant from one another (the greater the separation, the better the effects of rejection to the noise).

Thanks to this feature, the spurious oscillation that is obtained at output from the gyroscope is very small and, being at a frequency very far from the frequency of interest, can be effectively filtered by the reading electronics.

In particular, separating the resonance frequency of the mode in phase by bringing it to high frequency is even more advantageous, because, in general, the higher the frequency, the smaller is the amount of external accelerations acting on the sensor. In addition, bringing the mode in phase at a higher frequency it is possible to obtain a greater separation of the vibration modes (given that, while stiffening of the sensing structure is always advantageous, a reduction of its stiffness can never be excessive); filtering of the frequency contributions of the undesirable mode is more effective.

A further advantage of the present coupling structure is that, in the case of capacitive reading, the stiffness increase for the vibration of the in-phase mode leads to a smaller variation of gap between the electrodes (and hence of the device sensitivity) in the presence of the acceleration of gravity.

In addition, the coupling of the sensing masses increases considerably (substantially doubles, given the same frequency) the stiffness of the system in the direction of detection, rendering it more robust, for example, creating a greater resistance to the problem of stiction (sticking of the mobile electrodes against the fixed elements of the structure). In a known way, stiction is a phenomenon due to the force of adhesion between surfaces in contact. If following upon a shock, the mobile elements come into contact with the fixed elements, between the surfaces of contact a force of adhesion is generated, which tends to keep them united. Opposed to this force of adhesion is the force of elastic return, which is proportional to the stiffness of the system. Given the same frequency, the greater the mass involved the greater the strength. In the uncoupled system the mass involved is given by the mass of the single sensing mass. In the coupled system, instead, the mass involved is the total mass of the two sensing masses. If the masses are equal, the strength involved then doubles. Intuitively, in the coupled system, if a sensing mass is subjected to the stiction phenomenon, not only its elastic elements, but also those of the second sensing mass connected thereto oppose the force of adhesion.

Figure 11:
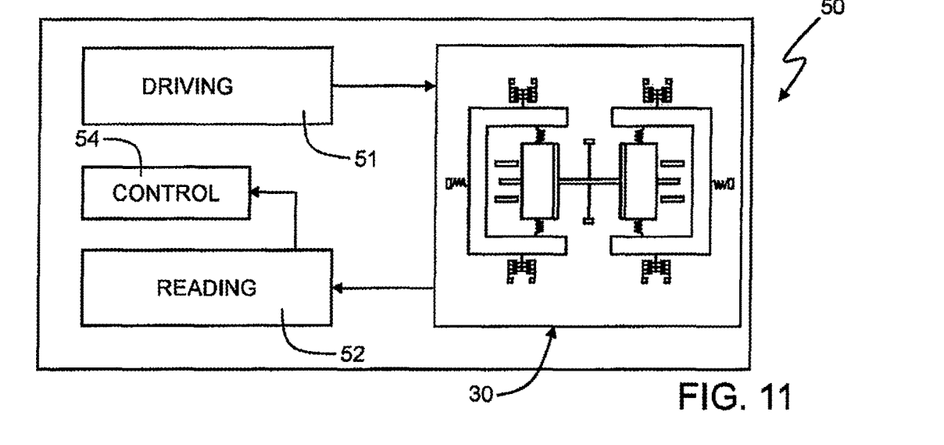
FIG. 11 shows a simplified block diagram of an electronic device provided with a MEMS gyroscope according to yet a further aspect of the present disclosure.

Basically, the aforesaid features render the MEMS gyroscopes particularly indicated for integration in an electronic device 50, as illustrated in FIG. 11, that can be used in a plurality of electronic systems, for example, in inertial-navigation systems, in automotive systems, or in systems of a portable type, such as for example a PDA (Personal Digital Assistant), a portable computer, a mobile phone, a digital audio player, a photographic or video camera, the electronic device 50 generally being able to process, store, transmit and receive signals and information.

The electronic device 50 comprises: a driving circuit 51, operatively coupled to the driving assembly to impart the driving movement on the various driving masses 3, and supply biasing signals to the microelectromechanical structures. A reading circuit 52, operatively coupled to the detection capacitors of the sensing masses to detect the amount of the displacements of the same sensing masses and hence determine the angular velocities acting on the structure; and an electronic control unit 54, for example, a microprocessor control unit, connected to the reading circuit 52, and designed to supervise the overall operation of the electronic device 50, for example, based on the angular velocities detected and determined.

Finally, it is clear that modifications and variations can be made to what has been described and illustrated herein, without thereby departing from the scope of the present disclosure.

In particular, it is clear that the solution described for implementing the coupling elements (as mentioned previously, having a hinge function) of the coupling structure between the sensing masses of each pair is not to be understood as in any way limiting, and that further solutions can be equally envisaged for this purpose.

For example, the opposed springs, set as a prolongation of one another to form these coupling elements, could be of the folded type, having in any case a main extension (or development) in the same direction (in particular, in the direction transverse to the rigid element 22).

In addition, the intermediate point of constraint of the rigid connection element 22 could be connected to a different element, fixed with respect to the movement of detection, for example to the driving mass 3 instead of to the substrate 36.

In general, it is clear that modifications to the configuration of some of the structural elements of the MEMS gyroscopes may be envisaged. For instance, the driving masses 3 may have a different shape, i.e., different from the one illustrated, just as the shape of the sensing masses may also be different.

In addition, the displacement of the sensing masses can be determined with techniques different from the capacitive one, for example by means of the detection of a magnetic force; and the driving movement can be generated in a different way, for example by means of parallel-plate electrodes, or else with a magnetic actuation.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    a substrate;
    an anchor on the substrate;
    a rigid coupling element coupled to the anchor;
    a first pair of sensing masses coupled to the rigid coupling element along a first axis; and
    a second pair of sensing masses coupled to the rigid coupling element along a second axis that is transverse to the first axis.

2. The device of claim 1, further comprising:
    a first pair of driving masses coupled to the first pair of sensing masses; and
    a second pair of driving masses coupled to the second pair of sensing masses.

3. The device of claim 2 wherein the rigid coupling element is spaced from the first pair of driving masses by the first pair of sensing masses and the rigid coupling element is spaced from the second pair of driving masses by the second pair of sensing masses.

4. The device of claim 3 wherein each of the masses of the first and second pairs of driving masses includes an opening and one of the masses from the first or second pair of sensing masses is positioned within the opening.

5. The device of claim 4, further comprising a third pair of sensing masses positioned between the second pair of driving masses and the second pair of sensing masses.

6. A device, comprising:
    a substrate;
    an anchor on the substrate;
    a first rigid coupling element coupled to the anchor;
    a first pair of sensing masses coupled to the first rigid coupling element along a first axis;
    a second pair of sensing masses coupled to the first rigid coupling element along a second axis that is transverse to the first axis; and
    a third pair of sensing masses coupled to the second pair of sensing masses.

7. The device of claim 6 wherein the first pair of sensing masses is configured to detect rotation about the second axis, the second pair of sensing masses is configured to detect rotation about the first axis, and the third pair of sensing masses is configured to detect rotation about a third axis that is transverse to the first and second axis.

8. The device of claim 6, further comprising a second rigid coupling element positioned around and coupled to the first rigid coupling element.

* * * * *